(12) United States Patent
Jung

(10) Patent No.: US 12,110,054 B2
(45) Date of Patent: Oct. 8, 2024

(54) APPARATUS AND METHOD FOR CONTROLLING DRIVING OF VEHICLE

(71) Applicants: HYUNDAI MOTOR COMPANY, Seoul (KR); Kia Corporation, Seoul (KR)

(72) Inventor: Jae Won Jung, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 242 days.

(21) Appl. No.: 17/721,817

(22) Filed: Apr. 15, 2022

(65) Prior Publication Data

US 2023/0017579 A1    Jan. 19, 2023

(30) Foreign Application Priority Data

Jul. 13, 2021    (KR) .................... 10-2021-0091791

(51) Int. Cl.
| | |
|---|---|
| *B62D 15/02* | (2006.01) |
| *B60Q 1/24* | (2006.01) |
| *B60Q 9/00* | (2006.01) |
| *B60R 1/12* | (2006.01) |
| *G06T 7/50* | (2017.01) |
| *G06V 20/56* | (2022.01) |
| *B60W 30/12* | (2020.01) |

(52) U.S. Cl.
CPC ......... *B62D 15/0265* (2013.01); *B60Q 1/249* (2022.05); *B60Q 9/008* (2013.01); *B60R 1/1207* (2013.01); *G06T 7/50* (2017.01); *G06V 20/588* (2022.01); *B60W 30/12* (2013.01); *G06T 2207/30256* (2013.01); *G06T 2207/30261* (2013.01)

(58) Field of Classification Search
CPC .... B62D 15/0265; B60Q 9/008; B60Q 1/249; B60Q 1/2665; B60Q 1/48; B60R 1/1207; G06T 7/50

See application file for complete search history.

(56) References Cited

U.S. PATENT DOCUMENTS

| | | | |
|---|---|---|---|
| 9,227,635 B1 * | 1/2016 | Takamatsu ........... | B62D 15/025 |
| 2017/0232890 A1 * | 8/2017 | Lewis .................. | G06V 20/586 |
| | | | 348/148 |
| 2017/0282973 A1 * | 10/2017 | Takamatsu ........... | B62D 15/029 |
| 2021/0157465 A1 * | 5/2021 | Turk ........................ | B60R 1/26 |

FOREIGN PATENT DOCUMENTS

| | | | | |
|---|---|---|---|---|
| DE | 102009007408 A1 * | 8/2010 | ............... | B60R 1/00 |
| DE | 102019111477 A1 * | 11/2020 | | |

* cited by examiner

*Primary Examiner* — George C Jin
(74) *Attorney, Agent, or Firm* — MORGAN, LEWIS & BOCKIUS LLP

(57) ABSTRACT

An apparatus and method for controlling driving of a vehicle are provided and the apparatus includes a lamp that projects a lamp light onto one of a left floor surface or a right floor surface of the vehicle, a camera that obtains an image of an area onto which the lamp light is projected, and a controller that determines whether to output a warning based on the image of the area onto which the lamp light is projected when the lamp light is projected onto a boundary stone located around at least one of the left floor surface or the right floor surface of the vehicle.

20 Claims, 11 Drawing Sheets

APPARATUS AND METHOD FOR CONTROLLING DRIVING OF VEHICLE

CROSS-REFERENCE TO RELATED APPLICATION

The present application claims the benefit of priority to Korean Patent Application No. 10-2021-0091791, filed in the Korean Intellectual Property Office on Jul. 13, 2021, the entire contents of which are incorporated herein by reference.

TECHNICAL FIELD

The present disclosure relates to an apparatus and method for controlling driving of a vehicle.

BACKGROUND

Although the entrance and exit of a parking lot in a building are designed with a width prescribed by law, due to space restrictions, the entrance and exit of the parking lot are steep and there are many places with severe curves, so experienced drivers as well as inexperienced drivers may often have difficulty in driving the vehicle through the entrance and exit. In particular, in recent years, the body of a vehicle has been increasing in order to improve the user's convenience, and due to the aging of the parking lot, the lighting condition of the parking lot access road is not good in many places, so that it is difficult for a driver to accurately determine the boundary between the entrance and exit of the parking lot, so the difficulty in entering and exiting the parking lot has been aggravated.

Accordingly, a scheme using a sensor for detecting the front and rear of a vehicle has been proposed to allow a driver to recognize the boundary of the entrance and exit of the parking lot, but it is difficult to detect a curb (boundary stone) provided to minimize a direct collision between the side wall of the parking lot and the vehicle only by using a sensor provided in the vehicle, so that it may cause an accident in which the tire wheel is scratched or the tire is damaged. Therefore, there is a need to develop technology capable of safely driving a vehicle through the entrance and exist of a parking lot in various environments.

The information disclosed in the Background section above is to aid in the understanding of the background of the present disclosure, and should not be taken as acknowledgement that this information forms any part of prior art.

SUMMARY

The present disclosure has been made to solve the above-mentioned problems occurring in the prior art while advantages achieved by the prior art are maintained intact.

An aspect of the present disclosure provides an apparatus and a method for controlling driving of a vehicle capable of safely driving the vehicle through the entrance and an exit of a parking lot in various environments.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling driving of a vehicle includes a lamp that projects a lamp light onto one of a left floor surface or a right floor surface of the vehicle, a camera that obtains an image of an area onto which the lamp light is projected, and a controller that determines whether to output a warning based on the image of the area onto which the lamp light is projected when the lamp light is projected onto a boundary stone located around at least one of the left floor surface or the right floor surface of the vehicle.

The controller may determine whether to output the warning based on the image of the area of a floor surface onto which the lamp light is projected in a same direction as a direction in which the vehicle turns.

The controller may determine a distance between the vehicle and the boundary stone based on the image of the area onto which the lamp light is projected.

The controller may compare a distance between the vehicle and the boundary stone with a safety distance and determine whether to output the warning based on a comparison result.

The safety distance may vary corresponding to a steering angle of a steering wheel of the vehicle.

The safety distance may increase as a steering angle of a steering wheel of the vehicle increases.

The controller may control to output the warning when the distance between the vehicle and the boundary stone is less than the safety distance.

The controller may control a steering angle of a steering wheel of the vehicle to keep the distance between the vehicle and the boundary stone to be the safety distance when the distance between the vehicle and the boundary stone is less than the safety distance.

The controller may control the steering angle of the steering wheel of the vehicle by using a lane keeping assistance system.

The lamp may be disposed on at least one of a lower portion of a left side mirror or a lower portion of a right side mirror of the vehicle.

According to another aspect of the present disclosure, a method of controlling driving of a vehicle includes projecting a lamp light onto one of a left floor surface or a right floor surface of the vehicle, obtaining an image of an area onto which the lamp light is projected, and determining whether to output a warning based on the image of the area onto which the lamp light is projected when the lamp light is projected onto a boundary stone located around at least one of the left floor surface or the right floor surface of the vehicle.

The determining of whether to output the warning may include determining whether to output the warning based on the image of the area of a floor surface onto which the lamp light is projected in a same direction as a direction in which the vehicle turns.

The method may further include determining a distance between the vehicle and the boundary stone based on the image of the area onto which the lamp light is projected.

The determining of whether to output the warning may include comparing a distance between the vehicle and the boundary stone with a safety distance to determine whether to output the warning based on a comparison result.

The safety distance may vary corresponding to a steering angle of a steering wheel of the vehicle.

The safety distance may increase as a steering angle of a steering wheel of the vehicle increases.

The method may further include controlling to output the warning when the distance between the vehicle and the boundary stone is less than the safety distance.

The method may further include controlling a steering angle of a steering wheel of the vehicle to keep the distance between the vehicle and the boundary stone to be the safety distance when the distance between the vehicle and the boundary stone is less than the safety distance.

The method may further include controlling the steering angle of the steering wheel of the vehicle by using a lane keeping assistance system.

The lamp may be disposed on at least one of a lower portion of a left side mirror or a lower portion of a right side mirror of the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
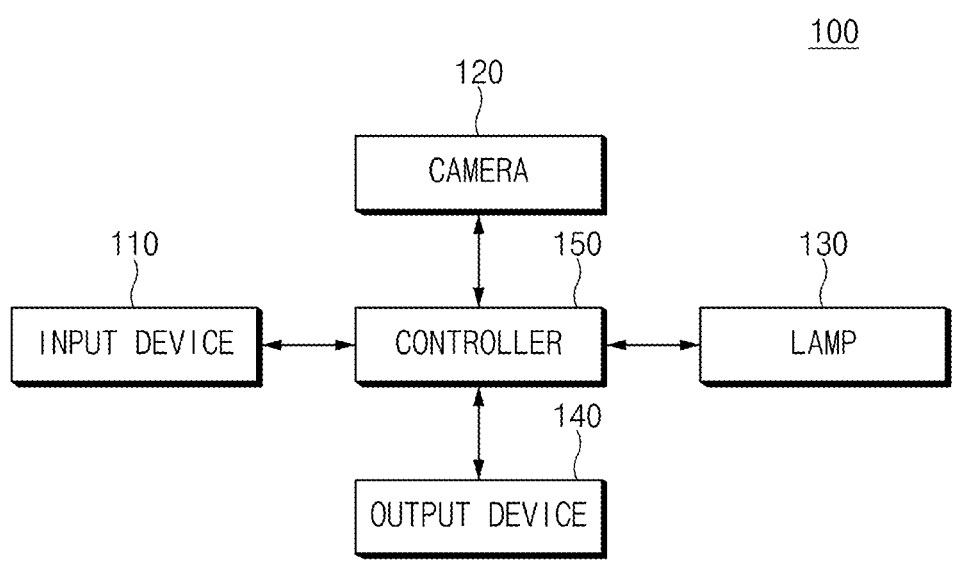
FIG. 1 is a block diagram illustrating the configuration of an apparatus for controlling driving of a vehicle according to an exemplary embodiment of the present disclosure.

Hereinafter, various exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiments of the present disclosure, a detailed description of the related known configuration or function will be omitted when it is determined that it interferes with the understanding of the embodiments of the present disclosure.

In describing the components of the embodiments according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal unless expressly so defined herein.

FIG. 1 is a block diagram illustrating the configuration of an apparatus for controlling driving of a vehicle according to an exemplary embodiment of the present disclosure.

As shown in FIG. 1, an apparatus 100 for controlling driving of a vehicle according to an exemplary embodiment of the present disclosure may include an input device 110, a camera 120, a lamp 130, an output device 140, and a controller 150.

The input device 110 may receive input information corresponding to the manipulation, operation, or voice of a driver and transmit it to the controller 150. The controller 150 may control the operation of the vehicle in response to the input information. According to an exemplary embodiment of the present disclosure, the input device 110 may transmit input information for generating a surround view (SVM) image to the controller 150. According to an exemplary embodiment, the input device 110 is implemented as a scroll wheel, a button, a knob, a touch screen, a touch pad, a lever, a track ball, or the like, which is operable by a driver, or at least one of a motion sensor or a voice recognition sensor that can sense a driver's motion or voice, or a combination thereof. The input device 110 may be arranged in a steering wheel area, and the driver may easily manipulate the input device 110 arranged in the steering wheel area while driving.

The camera 120 may be arranged on the left, rear, right and front of the vehicle to generate a surround view image according to an exemplary embodiment of the present disclosure to obtain a surrounding image including a floor surface near the vehicle. According to an exemplary embodiment of the present disclosure, the surrounding image including the floor surface near the vehicle obtained through the camera 120 may include an area onto which a lamp light is projected. According to an exemplary embodiment, a left camera may be arranged outside a case surrounding the left side mirror. However, the embodiment is not limited thereto, and the left camera may be arranged on a left front door, a left rear door, or a left fender. A right camera may be arranged outside the case surrounding a right side mirror. However, the embodiment is not limited thereto, and the right camera may be arranged on a right front door, a right rear door, or a right fender. A rear camera may be arranged near a rear license plate, a trunk, or a tailgate switch and a front camera may be arranged near a radiator grill.

The lamp 130 may be automatically turned on when a smart key approaches the vehicle after a specified time elapses after the smart key moves away from the vehicle. However, the embodiment is not limited thereto. According to an exemplary embodiment of the present disclosure, when the input information for generating a surround view image is transmitted from the input device 110 to the controller 150, the lamp 130 may be turned on under control of the controller 150. The lamp 130 may include a puddle lamp that is disposed on at least one of the left side mirror or the right side mirror to project the lamp light to one of the left and right floor surfaces of the vehicle. The details will be described with reference to FIGS. 2 and 3.

Figure 2:
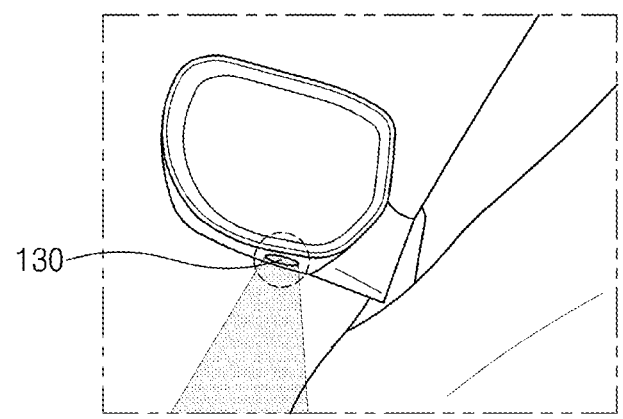
FIG. 2 is a view illustrating a lamp according to an exemplary embodiment of the present disclosure.
Figure 3:
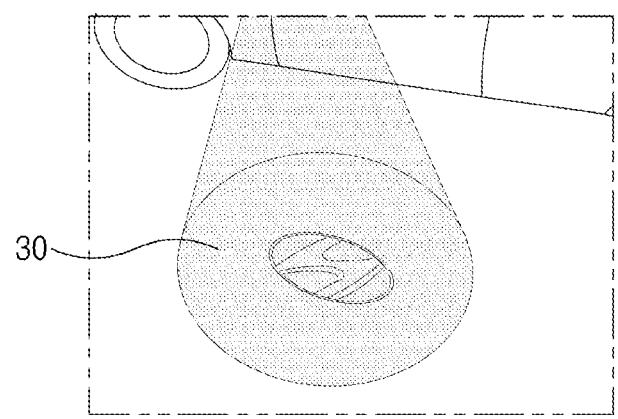
FIG. 3 is a view illustrating an area onto which a lamp light is projected according to an exemplary embodiment of the present disclosure.

FIG. 2 is a view illustrating a lamp according to an exemplary embodiment of the present disclosure. FIG. 3 is a view illustrating an area onto which a lamp light is projected according to an exemplary embodiment of the present disclosure.

As shown in FIG. 2, the lamp 130 may be disposed on the lower side of one of the left side mirror and the right side mirror of the vehicle to project the lamp light toward the floor surface. When the lamp light is projected on the floor surface, as shown in FIG. 3, an area 30 on which the lamp light is projected may be formed on the floor surface. When the lamp light is projected onto a flat floor surface, the projected area is not distorted, and when the height of the floor surface is not constant, the projected area may be distorted due to the difference in height of the floor surface.

The output device 140 may output a warning to the driver in at least one of a visual scheme, an auditory scheme, or a tactile scheme. According to an exemplary embodiment, the output device 140 may include a display that outputs an image or a video. The display may include an AVN display, a HUD, a cluster, and the like. The output device 140 may include a sound output device for outputting sound. The sound output device may include a speaker. In addition, the output device 140 may include a vibration output device for outputting vibration. The vibration output device may be provided on a seat or a steering wheel in the vehicle.

The controller 150 may include various processing devices such as a microprocessor in which a semiconductor chip capable of performing operation or execution of various commands is embedded, and the like and may control an operation of an apparatus for controlling driving of a vehicle according to an exemplary embodiment of the present disclosure. According to an exemplary embodiment of the present disclosure, when the lamp light is projected on a boundary stone located around at least one of the left or right floor surfaces of the vehicle, the controller 150 may determine whether to output a warning based on the image of the area on which the lamp light is projected. The operation of the controller 150 according to an exemplary embodiment of the present disclosure may be applied to prevent collision of a vehicle with a boundary stone arranged at the boundary with the side wall of the parking lot entrance and exit when the vehicle drives the narrow parking lot entrance and exit. However, the embodiment is not limited thereto, and the embodiment may also be applied to prevent collision of a vehicle with a boundary stone (curb) between a road and a sidewalk.

According to an exemplary embodiment of the present disclosure, when input information for generating a surround view image is received from the input device 110, the controller 150 may control the lamp 130 to be turned on. As the lamp 130 is turned on, the lamp light may be projected to the floor surface, so that an area onto which the lamp light is projected may be formed on the floor surface.

When the lamp 130 is turned on to form an area of the floor surface onto which the lamp light is projected, the camera 120 may photograph the floor surface around the vehicle including the area onto which the lamp light is projected. The controller 150 may determine whether to output a warning based on the floor image (a floor image including an area onto which the lamp light is projected) obtained through the camera 120. According to an exemplary embodiment, the controller 150 may determine whether to output a warning by preferentially considering the image of the area of the floor surface onto which the lamp light is projected in the same direction as the direction in which the vehicle turns. The details will be described with reference to FIG. 4.

Figure 4:
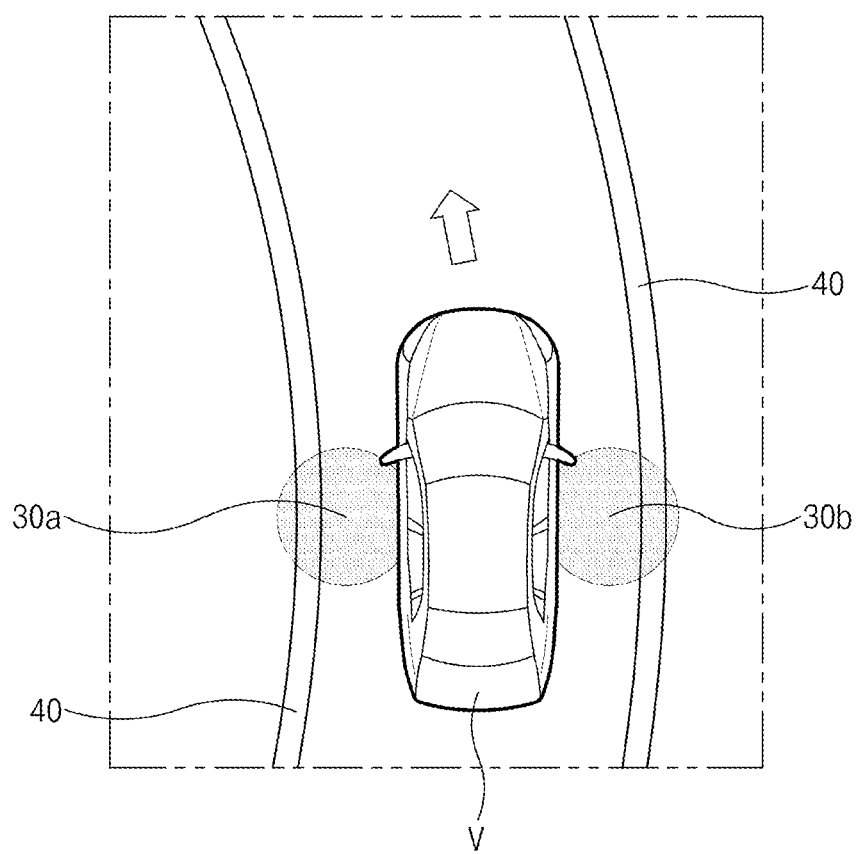
FIG. 4 is a diagram schematically illustrating a state in which a lamp light is projected on a boundary stone according to an exemplary embodiment of the present disclosure.

FIG. 4 is a diagram schematically illustrating a state in which a lamp light is projected on a boundary stone according to an exemplary embodiment of the present disclosure.

As shown in FIG. 4, when a vehicle "V" turns around left and areas 30a and 30b onto which the lamp light is projected are formed on boundary stones 40 located at the left and right sides of the vehicle "V", the controller 150 may determine whether to output a warning by preferentially utilizing the image of the area 30a of a floor surface onto which the lamp light is projected in the same direction as the direction in which the vehicle "V" turns around.

The controller 150 may determine the distance from the vehicle to the boundary stone 40 based on the floor image (the floor image including the area onto which the lamp light is projected) obtained through the camera 120. The details will be described with reference to FIG. 5.

Figure 5:
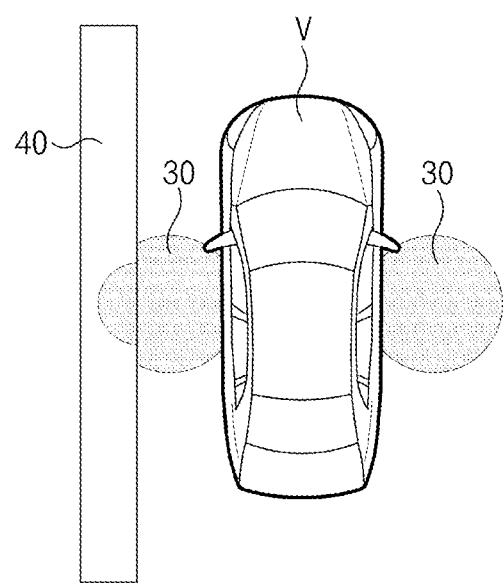
FIG. 5 is a diagram illustrating a distorted shape of an area onto which a lamp light is projected according to an exemplary embodiment of the present disclosure.

FIG. 5 is a diagram illustrating a distorted shape of an area onto which a lamp light is projected according to an exemplary embodiment of the present disclosure.

As shown in FIG. 5, when there is the boundary stone 40 in the periphery of the vehicle "V" and the area 30 onto which the lamp light is projected is formed over the floor surface and the surface of the boundary stone 40, the area onto which the lamp light is projected is distorted due to the height difference between the floor surface and the boundary stone 40. When it is determined that a distortion is generated in which the area 30 onto which the lamp light is projected is divided into the floor surface and the surface of the boundary stone 40 because there is the boundary stone 40 around the vehicle, the controller 150 may determine the distance from the vehicle to the boundary stone 40.

The controller 150 may compare the distance between the vehicle and the boundary stone 40 with the safety distance, and may determine whether to output a warning based on the comparison result. In this case, the safety distance may mean a distance at which the vehicle does not collide with a boundary stone while driving the vehicle. The safety distance may vary depending on the size of a vehicle, and may have a reference value that is a value preset in advance. However, the safety distance may vary according to a steering angle of a steering wheel that varies with the turning radius of a road on which the vehicle travels. According to an exemplary embodiment, the safety distance may increase on a road (section of a sharp curve) having with a small road turning radius as the steering angle of the steering wheel increases. In addition, when there is no change in the steering angle of the steering wheel as on a straight road, the preset reference value may be maintained.

The controller 150 may determine whether the distance between the vehicle and the boundary stone 40 is equal to or greater than the safety distance based on the floor image (the floor image including the area onto which the lamp light is projected) obtained through the camera 120. The details will be described with reference to FIGS. 6 to 8.

Figure 6:
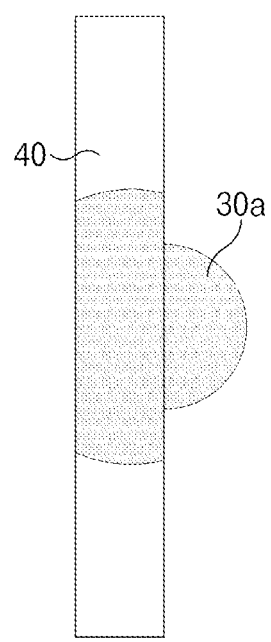
FIGS. 6 and 7 are diagrams illustrating an area of the boundary stone onto which a lamp light is projected when the distance between a vehicle and a boundary stone is less than a safety distance according to an exemplary embodiment of the present disclosure.
Figure 7:
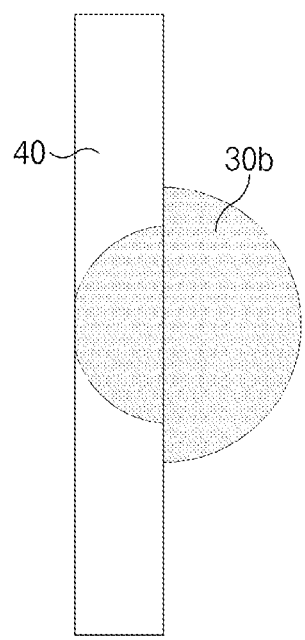
Figure 8:
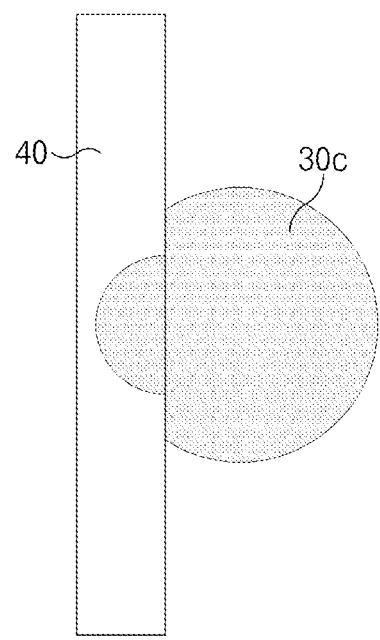
FIG. 8 is a diagram illustrating an area of a boundary stone on which a lamp light is projected when the distance between a vehicle and a boundary stone is equal to or greater than a safety distance according to an exemplary embodiment of the present disclosure.

FIGS. 6 and 7 are diagrams illustrating an area of the boundary stone onto which a lamp light is projected when the distance between a vehicle and a boundary stone is less than a safety distance according to an exemplary embodiment of the present disclosure. FIG. 8 is a diagram illustrating an area of a boundary stone on which a lamp light is projected when the distance between a vehicle and a boundary stone is equal to or greater than a safety distance according to an exemplary embodiment of the present disclosure.

As shown in FIGS. 6 to 8, the area 30 onto which the lamp light is projected may be divided into the floor surface and the surface of the boundary stone 40 to be distorted. The controller 150 may calculate the area of the area 30a, 30b or 30c of the floor surface onto which the lamp light is projected, and based on the area of the area of the floor surface onto which the lamp light is projected, the controller 150 may determine whether the distance from the vehicle to the boundary stone 40 is less than the safety distance.

According to the embodiment, as shown in FIGS. 6 and 7, when the area of the area 30a or 30b of the floor surface onto which the lamp light is projected is equal to or greater than a first value and less than a second value, it may be determined that the distance from the vehicle to the boundary stone 40 is less than the safety distance. In this case, the first value may have a value of 0 (zero) or more and the second value may exceed the first value. In addition, as shown in FIG. 8, when the area of the area 30c of the floor surface onto which the lamp light is projected is equal to or greater than a third value, it may be determined that the distance between the vehicle and the boundary stone 40 is equal to or greater than the safety distance. In this case, the third value may exceed the second value. The first to third values may be set differently depending on the type of vehicle.

When the controller 150 determines that the distance between the vehicle and the boundary stone 40 is equal to or greater than the safety distance, the controller 150 may determine that the vehicle can be driven without collision with the boundary stone 40. To the contrary, when the controller 150 determines that the distance between the vehicle and the boundary stone 40 is not greater than (less than) the safety distance, the controller 150 may determine that a collision may occur between the vehicle and the boundary stone 40 when the vehicle is driven and may control to output a warning. In this case, the controller 150 may control the warning to be output in visual, auditory and tactile schemes. According to an exemplary embodiment, the controller 150 may display a warning phrase on the cluster or AVN, output a beep sound, and output a vibration to the steering wheel.

In addition, the controller 150 may control the steering angle of the steering wheel such that the safety distance is maintained between the vehicle and the boundary stone 40. According to an exemplary embodiment, the controller 150 may control the steering angle of the steering wheel of the vehicle by using a lane keeping assistance system. For example, the controller 150 may control the steering angle of the steering wheel and assist a driver in driving such that the vehicle can maintain the safety distance based on the boundary stone 40 located at the left side of the vehicle on a road curved to the left. In addition, the controller 150 may control the steering angle of the steering wheel and assist a driver in driving such that the vehicle can maintain the safety distance based on the boundary stone 40 located at the right side of the vehicle on a road curved to the right.

Figure 9:
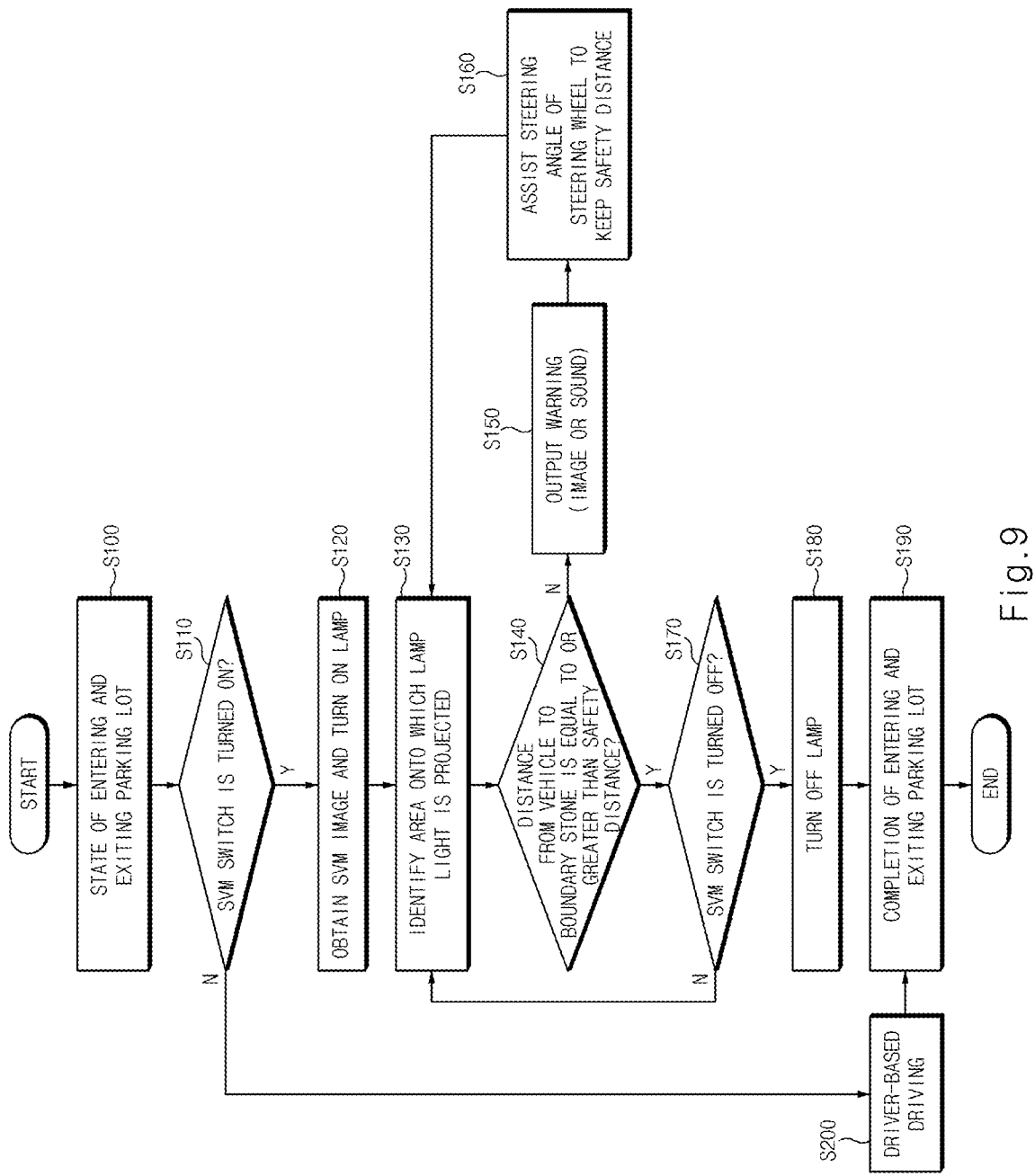
FIG. 9 is a flowchart illustrating a method of controlling driving of a vehicle according to an exemplary embodiment of the present disclosure.

FIG. 9 is a flowchart illustrating a method of controlling driving of a vehicle according to an exemplary embodiment of the present disclosure.

As shown in FIG. 9, in S100, the controller 150 may determine whether the vehicle is in the state of entering and exiting a parking lot. When the vehicle is in the state of entering and exiting the parking lot, in S110, the controller 150 may determine whether the surround view switch is in the turned-on state. When the surround view switch is in the turned-on state, the controller 150 may determine that input information for generating a surround view image is input to the input device 110. When the switch of the input device 110 is in the turned-on state, in S120, the controller 150 may obtain an image for generating a surround view image from the camera 120 and control the lamp to be turned on. In this case, the image obtained through the camera 120 may include a floor surface image including an area to which lamp light is projected. Meanwhile, when it is determined in S110 that the surround view switch is not in the turned-on state, in S200, the controller 150 may allow driving to be performed in the state of entering and exiting a parking lot based on the determination of a driver.

In S130, the controller 150 may identify the area onto which the lamp light is projected. In S130, the controller 150 may calculate the area of the area of the floor surface onto which the lamp light is projected.

In S140, the controller 150 may determine the distance from the vehicle to the boundary stone 40 based on the area of the area of the floor surface onto which the lamp light is projected and which is calculated in S130, and determine whether the distance from the vehicle to the boundary stone 40 is greater than or equal to the safety distance.

According to the embodiment, in S140, when the area of the area of the floor surface onto which the lamp light is projected is equal to or greater than the first value and less than the second value, the controller 150 may determine that the distance between the vehicle and the boundary stone 40 is less than the safety distance. In this case, the first value may have a value of 0 (zero) or more and the second value may exceed the first value. In addition, when the area of the area of the floor surface onto which the lamp light is projected is greater than or equal to the third value, the controller 150 may determine that the distance between the vehicle and the boundary stone 40 is equal to or greater than the safety distance. In this case, the safety distance may mean a distance at which the vehicle does not collide with a boundary stone while travelling. The safety distance may have a reference value that is preset based on the size of the vehicle. However, the safety distance may vary corresponding to the steering angle of the steering wheel that varies with the turning radius of the road on which the vehicle travels. According to an exemplary embodiment, the safety distance may increase as the steering angle of the steering wheel increases on a road (section of a sharp curve) with a small turning radius. In addition, when there is no change in the steering angle of the steering wheel, for example, on a straight road, the preset reference value may be maintained.

When it is determined in S140 that the distance from the vehicle to the boundary stone 40 is less than the safety distance (N), the controller 150 may control to output a warning in S150. In S150, the controller 150 may control the warning to be output in visual, auditory and tactile schemes. According to an exemplary embodiment, the controller 150 may display a warning phrase on a cluster or AVN, output a beep sound, and output a vibration to the steering wheel.

In addition, in S160, the controller 150 may control the steering angle of the steering wheel such that the safety distance is kept between the vehicle and the boundary stone 40. According to the embodiment, in S160, the controller 150 may control the steering angle of the steering wheel of the vehicle by using a lane keeping assistance system. For example, the controller 150 may control the steering angle of the steering wheel and assist in driving such that the vehicle can maintain the safety distance based on the boundary stone 40 located at the left side of the vehicle on a road curved to the left. In addition, the controller 150 may control the steering angle of the steering wheel and assist a driver in driving such that the vehicle can maintain the safety distance based on the boundary stone 40 located at the right side of the vehicle on a road curved to the right.

Meanwhile, when it is determined in S140 that the distance from the vehicle to the boundary stone 40 is equal to or greater than the safety distance (Y), the controller 150 may determine whether the surround view switch is in the turned-off state in S170. When it is determined that the surround view switch is in the turned-off state, the controller 150 may determine that the input information for generating the surround view image is no longer input to the input device 110. When it is determined in S170 that the surround view switch is not in the turned-off state (N), the controller 150 may perform S130.

In S180, the controller 150 may control the lamp to be turned off when the surround view switch is turned off. In addition, it may be completed to enter and exit the parking lot in S190.

Figure 10:
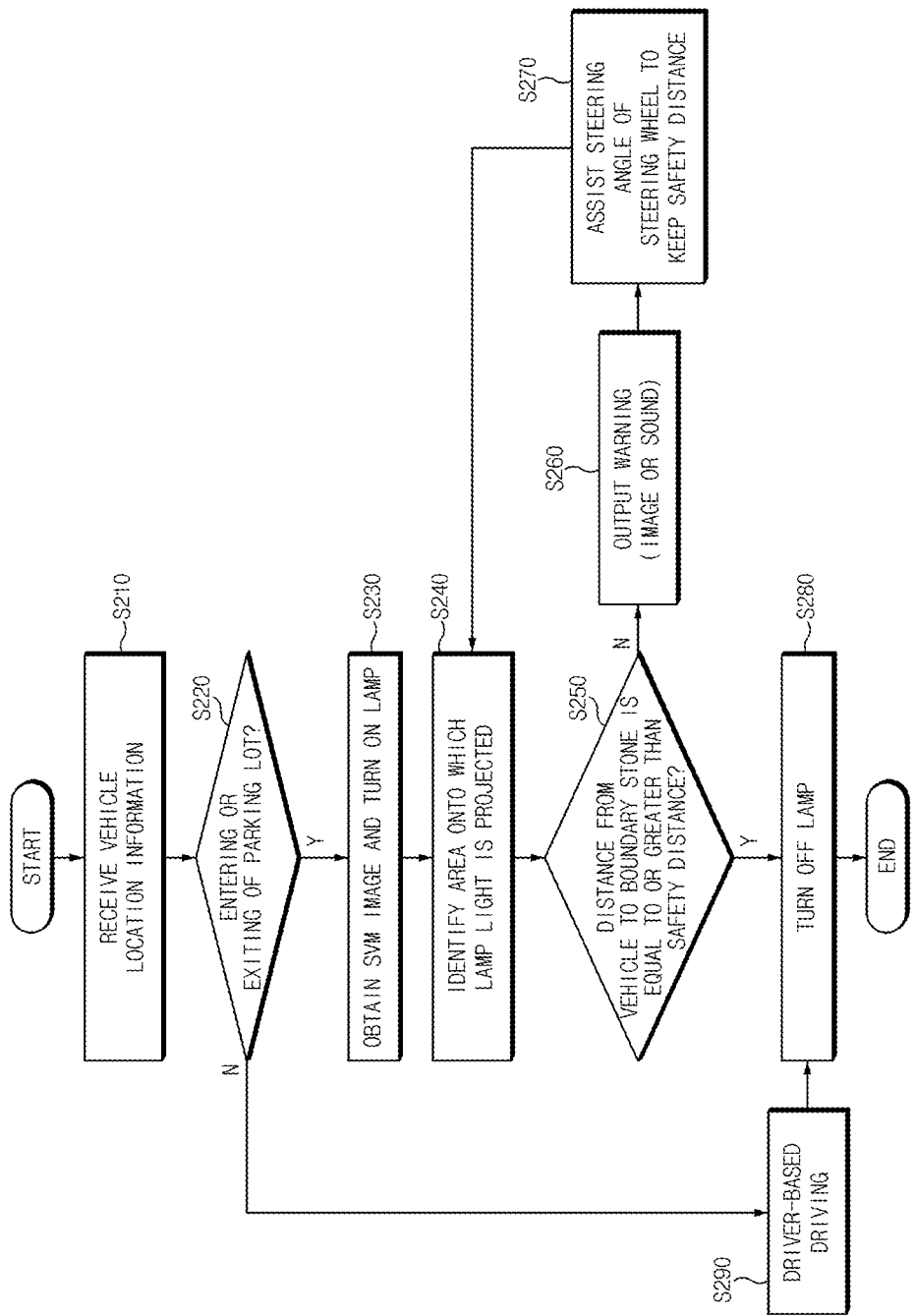
FIG. 10 is a flowchart illustrating a method of controlling driving of a vehicle according to another exemplary embodiment of the present disclosure.

FIG. 10 is a flowchart illustrating a method of controlling driving of a vehicle according to another exemplary embodiment of the present disclosure.

As shown in FIG. 10, in S210, the controller 150 may receive vehicle location information. According to an exemplary embodiment of the present disclosure, the controller 150 may receive the vehicle location information through a GPS receiving device separately provided.

In S220, the controller 150 may determine whether the vehicle enters or exits the parking lot in the building based on the location information of the vehicle received in S210. When it is determined in S220 that the vehicle is in the state of entering or exiting the parking lot in the building (Y), in S230, the controller may obtain an image for generating a surround view image from the camera 120 and control the lamp to be turned on. In this case, the image obtained through the camera 120 may include a floor surface image including an area to which lamp light is projected. Meanwhile, when it is determined that the vehicle is not in the state of entering or exiting the parking lot in the building, in S290, the controller 150 may allow driving to be performed based on the driver's determination.

In S240, the controller 150 may identify the area onto which the lamp light is projected. In S240, the controller 150 may calculate the area of the area of the floor surface onto which the lamp light is projected.

In S250, the controller 150 may determine the distance from the vehicle to the boundary stone 40 based on the area of the area of the floor surface onto which the lamp light is projected and which is calculated in S130, and determine whether the distance from the vehicle to the boundary stone 40 is greater than or equal to the safety distance.

When it is determined in S250 that the distance from the vehicle to the boundary stone 40 is less than the safety distance (N), the controller 150 may control to output a warning in S260. In S260, the controller 150 may control the warning to be output in visual, auditory and tactile schemes. According to an exemplary embodiment, the controller 150 may display a warning phrase on a cluster or AVN, output a beep sound, and output a vibration to the steering wheel.

In addition, in S270, the controller 150 may control the steering angle of the steering wheel such that the safety distance is kept between the vehicle and the boundary stone 40. According to the embodiment, in S270, the controller 150 may control the steering angle of the steering wheel of the vehicle by using a lane keeping assistance system. For example, the controller 150 may control the steering angle of the steering wheel and assist in driving such that the vehicle can maintain the safety distance based on the boundary stone 40 located at the left side of the vehicle on a road curved to the left. In addition, the controller 150 may assist the driving while controlling the steering angle of the steering wheel so that the vehicle can maintain a safety distance based on the boundary stone 40 positioned on the right side of the vehicle on the road curved to the right.

Meanwhile, when it is determined in S250 that the distance from the vehicle to the boundary stone 40 is equal to or greater than the safety distance (Y), in S280, the controller 150 may control the lamp to be turned off.

Figure 11:
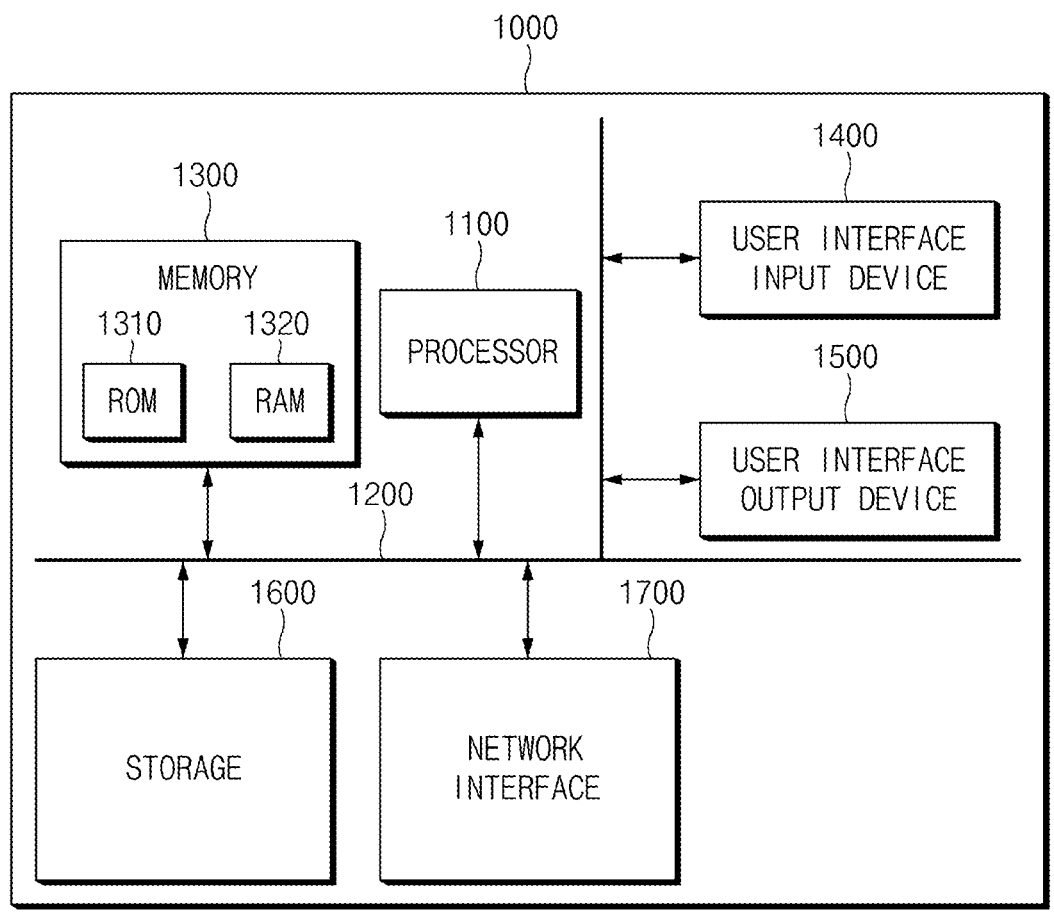
FIG. 11 is a block diagram illustrating a computing system for executing a method according to an exemplary embodiment of the present disclosure.

FIG. 11 is a block diagram illustrating a computing system for executing a method according to an exemplary embodiment of the present disclosure.

Referring to FIG. 11, a computing system 1000 may include at least one processor 1100, a memory 1300, a user interface input device 1400, a user interface output device 1500, storage 1600, and a network interface 1700 connected through a bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the apparatus and method for controlling driving of a vehicle of the present disclosure, it is possible to allow a vehicle to safely pass through the entrance and exit of a parking lot in various environments.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:
1. An apparatus for controlling driving of a vehicle, the apparatus comprising:
a lamp configured to project a lamp light onto one of a left floor surface or a right floor surface of the vehicle;

a camera configured to obtain an image of an area onto which the lamp light is projected; and a controller configured to determine whether to output a warning based on the image of the area onto which the lamp light is projected when the lamp light is projected onto a boundary stone located around at least one of the left floor surface or the right floor surface of the vehicle, wherein the controller controls the lamp to be turned on, when input information for generating a surround view image by the camera is received from an input device.

2. The apparatus of claim 1, wherein the controller is further configured to determine whether to output the warning based on the image of the area of a floor surface onto which the lamp light is projected in a same direction as a direction in which the vehicle turns.

3. The apparatus of claim 1, wherein the controller is further configured to determine a distance between the vehicle and the boundary stone based on the image of the area onto which the lamp light is projected.

4. The apparatus of claim 1, wherein the controller is further configured to compare a distance between the vehicle and the boundary stone with a safety distance and to determine whether to output the warning based on a comparison result.

5. The apparatus of claim 4, wherein the safety distance varies corresponding to a steering angle of a steering wheel of the vehicle.

6. The apparatus of claim 4, wherein the safety distance increases as a steering angle of a steering wheel of the vehicle increases.

7. The apparatus of claim 4, wherein the controller is further configured to control to output the warning when the distance between the vehicle and the boundary stone is less than the safety distance.

8. The apparatus of claim 4, wherein the controller is further configured to control a steering angle of a steering wheel of the vehicle to keep the distance between the vehicle and the boundary stone to be the safety distance when the distance between the vehicle and the boundary stone is less than the safety distance.

9. The apparatus of claim 8, wherein the controller is further configured to control the steering angle of the steering wheel of the vehicle by using a lane keeping assistance system.

10. The apparatus of claim 1, wherein the lamp is disposed on at least one of a lower portion of a left side mirror or a lower portion of a right side mirror of the vehicle.

11. A method of controlling driving of a vehicle, the method comprising:

projecting a lamp light onto one of a left floor surface or a right floor surface of the vehicle;

obtaining an image of an area onto which the lamp light is projected; and determining whether to output a warning based on the image of the area onto which the lamp light is projected when the lamp light is projected onto a boundary stone located around at least one of the left floor surface or the right floor surface of the vehicle, wherein the lamp is turned on, when input information for generating a surround view image by the camera is received from an input device.

12. The method of claim 11, wherein the determining whether to output a warning includes:

determining whether to output the warning based on the image of the area of a floor surface onto which the lamp light is projected in a same direction as a direction in which the vehicle turns.

13. The method of claim 11, further comprising:

determining a distance between the vehicle and the boundary stone based on the image of the area onto which the lamp light is projected.

14. The method of claim 11, wherein the determining whether to output a warning includes:

comparing a distance between the vehicle and the boundary stone with a safety distance and determining whether to output the warning based on a comparison result.

15. The method of claim 14, wherein the safety distance varies corresponding to a steering angle of a steering wheel of the vehicle.

16. The method of claim 14, wherein the safety distance increases as a steering angle of a steering wheel of the vehicle increases.

17. The method of claim 14, further comprising:

controlling to output the warning when the distance between the vehicle and the boundary stone is less than the safety distance.

18. The method of claim 14, further comprising:

controlling a steering angle of a steering wheel of the vehicle to keep the distance between the vehicle and the boundary stone to be the safety distance when the distance between the vehicle and the boundary stone is less than the safety distance.

19. The method of claim 18, further comprising:

controlling the steering angle of the steering wheel of the vehicle by using a lane keeping assistance system.

20. The method of claim 11, wherein the lamp is disposed on at least one of a lower portion of a left side mirror or a lower portion of a right side mirror of the vehicle.

* * * * *